T. KALEMBA.
ANIMAL TRAP.
APPLICATION FILED JAN. 17, 1921.

1,384,698.

Patented July 12, 1921.
2 SHEETS—SHEET 1.

INVENTOR
T. Kalemba
BY
ATTORNEY

T. KALEMBA.
ANIMAL TRAP.
APPLICATION FILED JAN. 17, 1921.
1,384,698.
Patented July 12, 1921.
2 SHEETS—SHEET 2.
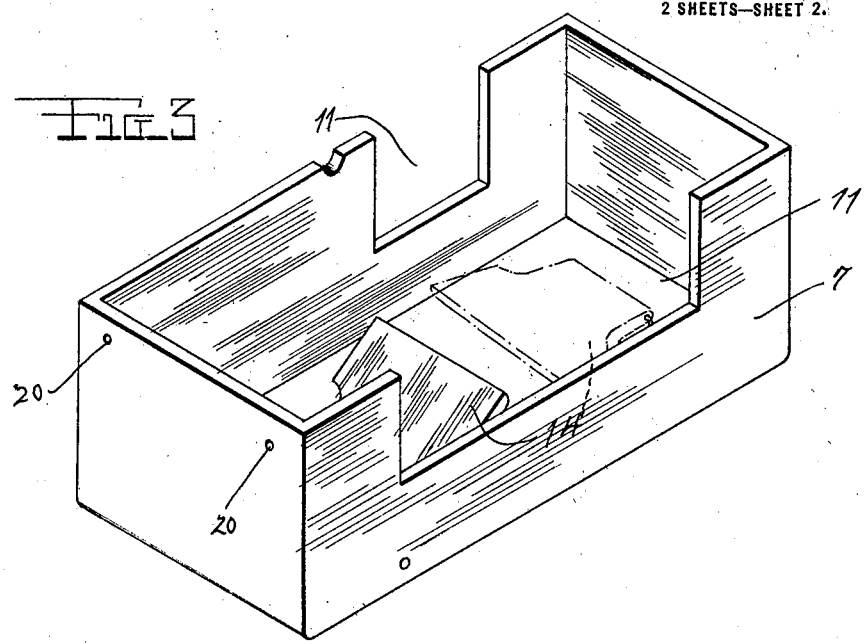
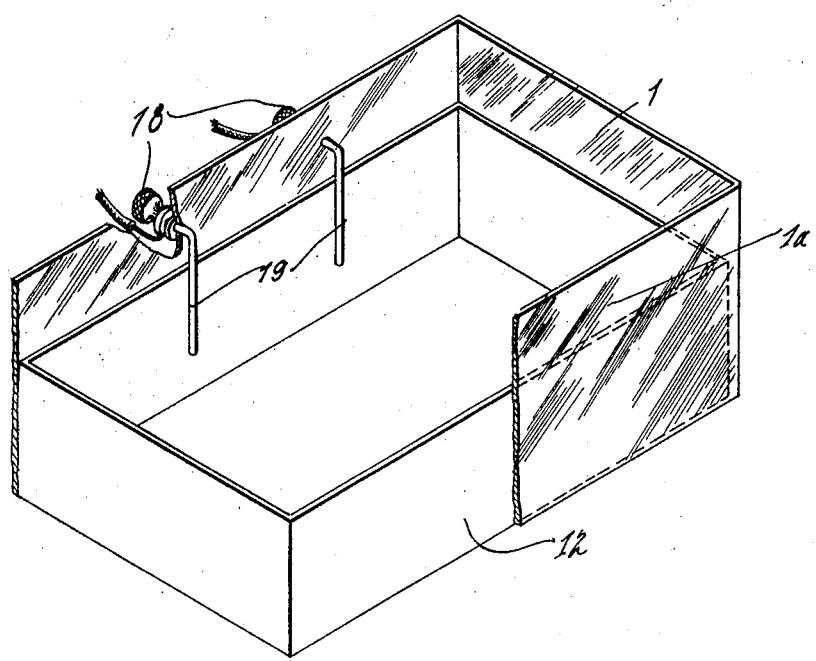
INVENTOR
T. Kalemba
BY
ATTORNEY

UNITED STATES PATENT OFFICE.

TOMASZ KALEMBA, OF UNIONTOWN, PENNSYLVANIA.

ANIMAL-TRAP.

1,384,698.  Specification of Letters Patent.  Patented July 12, 1921.

Application filed January 17, 1921. Serial No. 437,766.

*To all whom it may concern:*

Be it known that I, TOMASZ KALEMBA, a citizen of Poland, residing at Uniontown, in the county of Fayette and State of Pennsylvania, have invented certain new and useful Improvements in Animal - Traps, of which the following is a specification.

The main object of this invention is to provide a trap for mice, rats, and other small animals, which is able to entrap a plurality of said animals without resetting, and which also kills them after they are caught.

The above and other objects will become apparent in the description below, in which like-named characters of reference refer to like-named parts in the drawings.

Referring briefly to the drawings, Figure 1 is a plan view of my device.

Fig. 3 is a perspective view of one of the inner chambers of the trap.

Fig. 4 is a perspective view of the other inner chamber of the trap, part of the outer casing of the trap being shown in section.

Figure 1:
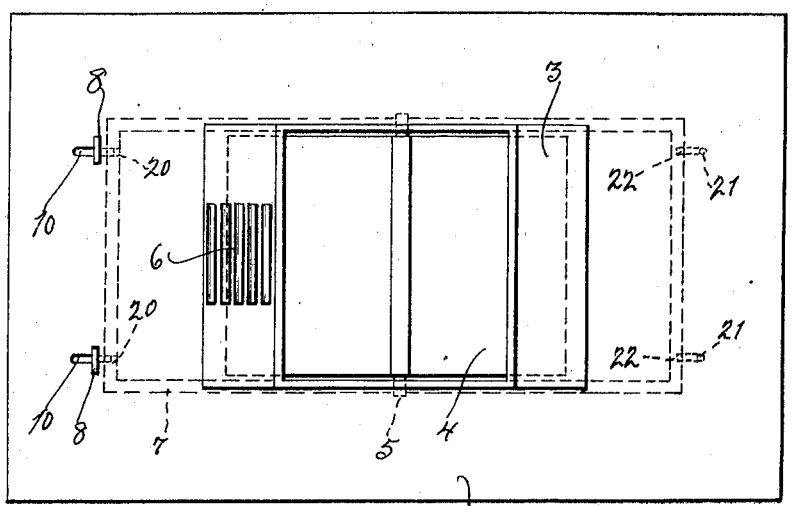
Figure 2:
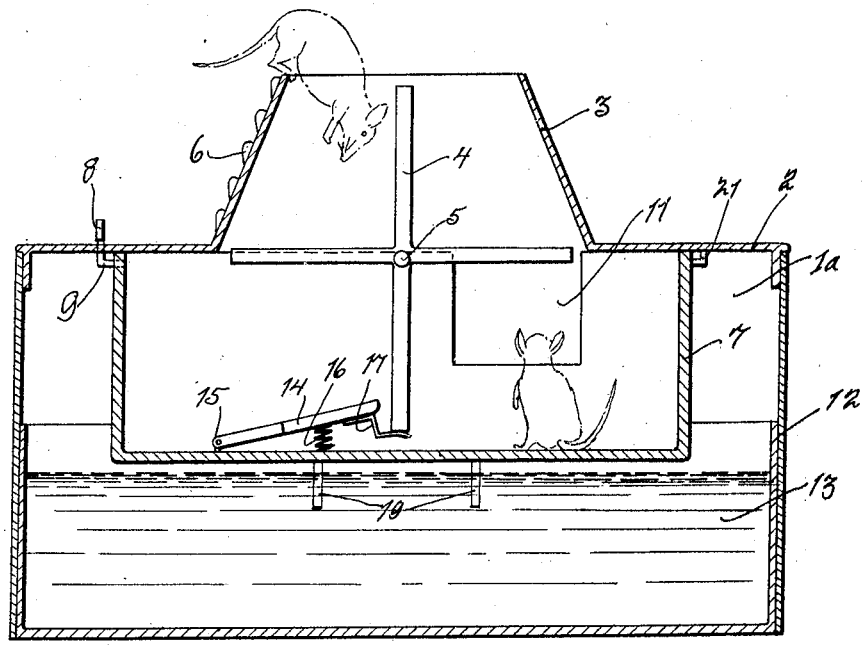
Fig. 2 is a substantially central cross-sectional view of the same.

Referring now in detail to the drawings, the numeral 1 represents the outer casing of my trap, having a removable cover 2 thereon provided with a substantially inverted-funnel-shaped entrance 3 therein. A wheel 4 is rotatably mounted upon a spindle 5 supported in the cover 2, said wheel comprising a pair of intersecting planes providing four quadrantal sectors. A ladder-like walk is provided on one of the inclined sides of the entrance 3, at 6. A chamber 7 is supported under the cover 2 by means of rigid pins 21 on the cover engaging recesses 22 on the said chamber, on one end of the latter, and slidable pins 9 mounted in slots 10 in said cover, on the other end of said chamber, said pins 9 having gripping members 8 whereby the same may be moved in their slots. Thus it is apparent that, in order to gain access to the chamber 7, it is only necessary to lift the cover 2 from the casing 1, then to slide the pins 9 toward the end of the casing, whence said chamber may be withdrawn from the pins 21.

Portions of the side walls of the chamber 7 are removed to provide passages 11, and under said chamber, in the base of the casing 1, is mounted a second chamber or tank 12 having water or other liquid 13 therein. On the base of the chamber 7 a member 14 is pivotally mounted at 15, and is normally urged in a counter-clockwise direction by a spring 16. A resilient tongue 17 is rigid upon the end of said member 14. A bait possessed with a stringent odor, such as cheese, is placed within the chamber 7, so that the odor therefrom will rise through the entrance 3, and attract the animal to urge him to climb the walk 6 and, finally, to drop upon the wheel 4. The weight of the animal will then cause the wheel to turn in a counter-clock-wise direction, dropping the animal into the chamber 7. In rotating, the blade of the wheel which was struck by the animal will engage the member 14, depressing the same in passing, but as soon as the blade has passed said member, the latter will rise very quickly so that the tongue 17 will engage the edge of the blade and retain the same in position displaced 90 degrees from its former position. This leaves the trap prepared as before.

The animal being now entrapped in the chamber 7, will be attracted by the light appearing through the passages 11 through the glass side walls 1ª, and will pass through one of said passages and into the liquid 13 in the tank 12. I prefer to mount two electrodes 19 in said tank, connected to wires 18 leading from an electrical supply of suitable voltage, so that the animal will be instantly electrocuted. This latter, however, may be omitted, and the animal will then be drowned in the liquid.

I claim:

1. A device of the class described comprising an outer casing, a cover secured thereto, a substantially inverted-funnel-shaped entrance in said cover, a wheel rotatably mounted under said entrance, said wheel being composed of two intersecting planes providing four quadrantal sectors, a chamber releasably supported beneath said cover, said wheel being adapted to be rotated by the weight of an animal thereon, and means for stopping said wheel after the same has been rotated one-fourth of a revolution.

2. A device of the class described comprising an outer casing, a cover secured thereto, a substantially inverted-funnel-shaped entrance in said cover, a wheel rotatably mounted under said entrance, said wheel being composed of two intersecting planes providing four quadrantal sectors, a chamber releasably supported beneath said cover, said wheel being adapted to be rotated by the weight of an animal thereon, and means for stopping said wheel after the same has been rotated one-fourth of a revolution comprising a member pivotally mounted on the floor of said chamber, a spring urging said member upward about its pivot, the end of said member lying in the path of said wheel and a resilient tongue extending from the end of said member.

In witness whereof I affix my signature.

TOMASZ KALEMBA.